United States Patent
Su

(10) Patent No.: US 8,011,733 B2
(45) Date of Patent: Sep. 6, 2011

(54) WHEEL WITH THERMOELECTRIC ENERGY CONVERSION MODULE

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 233 days.

(21) Appl. No.: 12/432,749

(22) Filed: Apr. 30, 2009

(65) Prior Publication Data

US 2010/0231027 A1    Sep. 16, 2010

(30) Foreign Application Priority Data

Mar. 13, 2009  (CN) .......................... 2009 1 0300861

(51) Int. Cl.
*B60B 19/00* (2006.01)
*H01L 37/00* (2006.01)

(52) U.S. Cl. ........................................ 301/5.1; 136/205

(58) Field of Classification Search ................ 301/5.1, 301/36.1, 53; 136/205
See application file for complete search history.

(56) References Cited

U.S. PATENT DOCUMENTS

| 3,708,006 | A  | * | 1/1973 | King ............................. 152/153 |
| 7,687,943 | B2 | * | 3/2010 | Lunde ............................ 310/15 |
| 7,777,126 | B2 | * | 8/2010 | Chu ............................. 136/212 |

FOREIGN PATENT DOCUMENTS

| JP | 2004282851 | A | * | 10/2004 |
| JP | 2006023084 | A | * | 1/2006 |

* cited by examiner

*Primary Examiner* — Kip T Kotter
(74) *Attorney, Agent, or Firm* — Frank R. Niranjan

(57) ABSTRACT

A wheel includes a metal rim, an electrically conductive hub, a thermoelectric device, and a battery. The metal rim is exposed out of a circumference surface of the wheel for contacting with the ground. The thermoelectric device is connected between the metal rim and the electrically conductive hub for generating electric energy using temperature difference between the metal rim and the electrically conductive hub. The battery has two electrodes connected to the metal rim and the electrically conductive hub, respectively. The battery is configured for collecting electric energy generated by the thermoelectric device.

12 Claims, 4 Drawing Sheets

WHEEL WITH THERMOELECTRIC ENERGY CONVERSION MODULE

BACKGROUND

1. Technical Field

The present disclosure relates to wheels and, particularly, to a wheel with thermoelectric energy conversion module.

2. Description of Related Art

At present, lack of energy becomes a more and more serious problem for human beings. However, there are also many types of energy, such as the heat energy generated on wheels caused by friction between the wheels and the ground, around us being not properly used.

What is needed, therefore, is a wheel which can collect the heat energy on wheel caused by friction between the wheel and the ground.

BRIEF DESCRIPTION OF THE DRAWINGS

Many aspects of the present wheel can be better understood with reference to the accompanying drawings. The components in the drawings are not necessarily drawn to scale, the emphasis instead being placed upon clearly illustrating the principles of the present wheel.

DETAILED DESCRIPTION

Embodiments of the present disclosure will now be described in detail below, with reference to the accompanying drawings.

Figure 1:
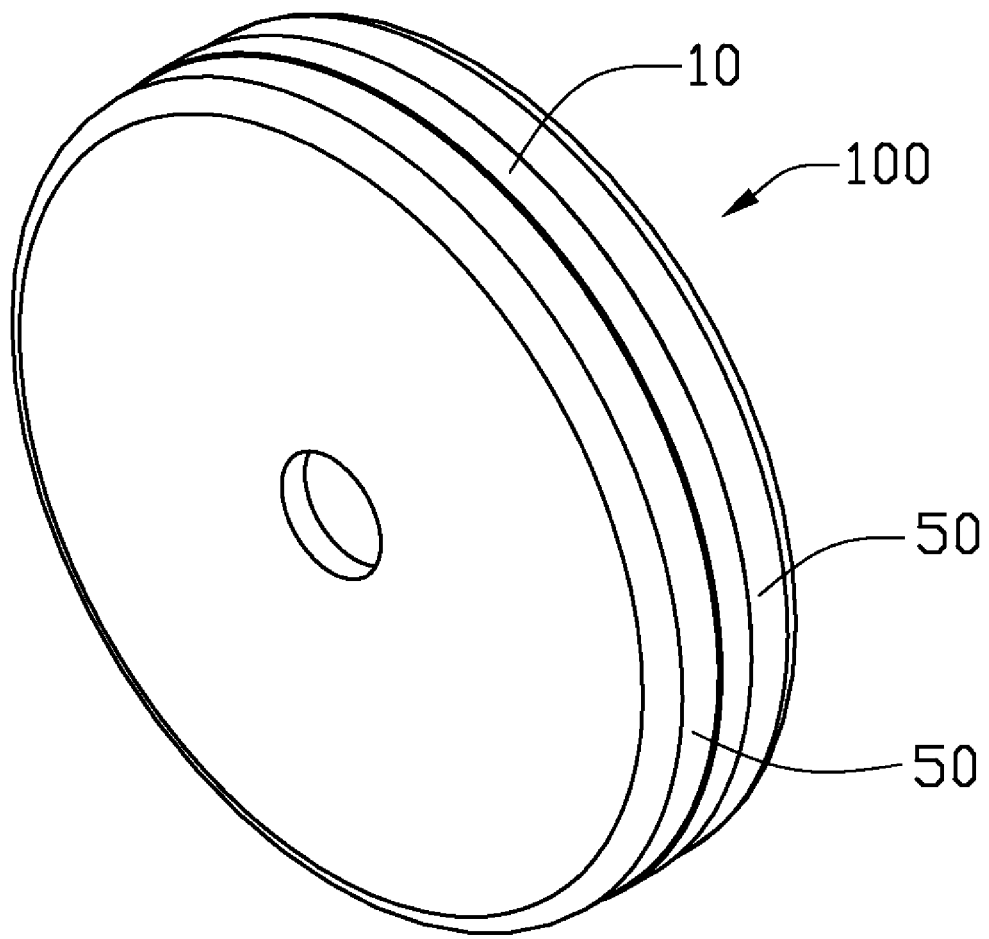
FIG. 1 is a schematic view of a wheel according to a first exemplary embodiment.
Figure 2:
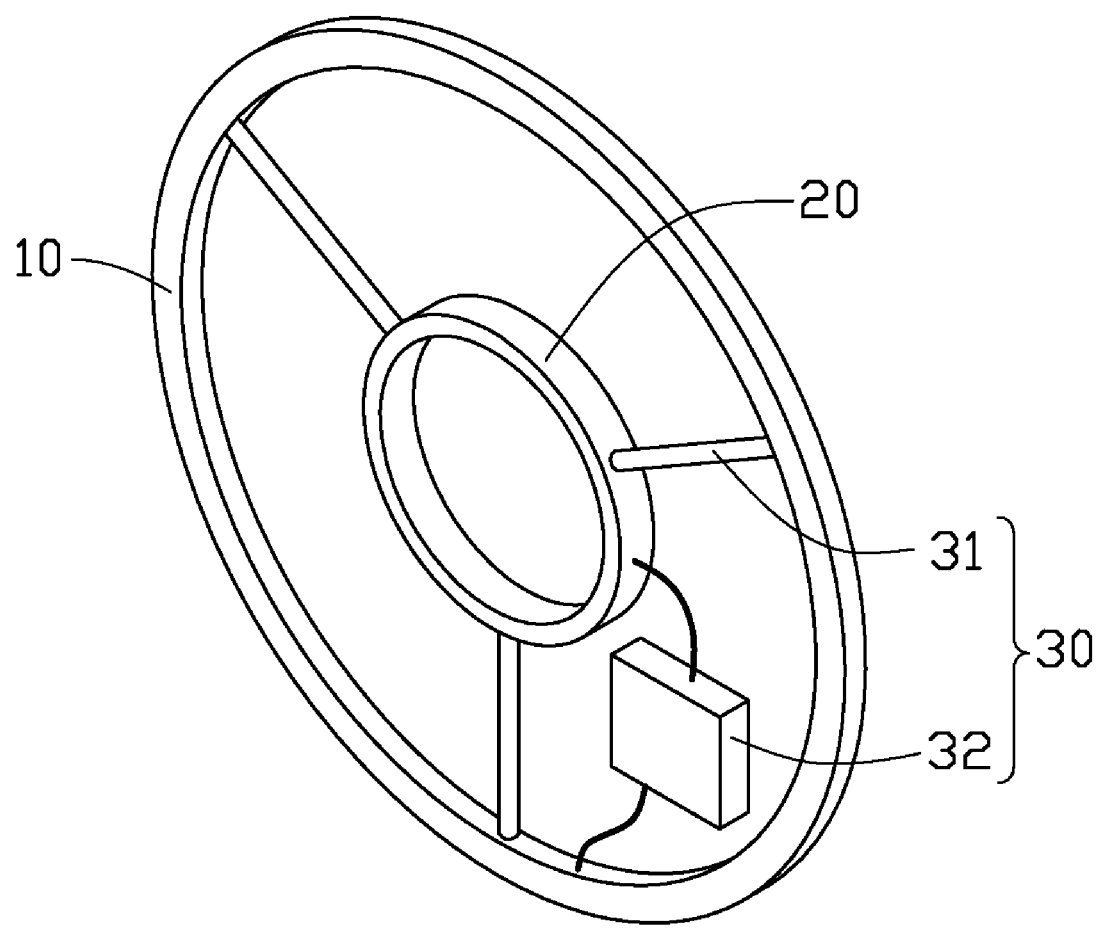
FIG. 2 illuminates the inner structure of the wheel of FIG. 1.

Referring to FIG. 1 and FIG. 2, a wheel 100, according to a first exemplary embodiment, is shown. The wheel 100 includes a rim 10, a hub 20, a thermoelectric energy conversion module 30. The wheel 100 can be a car wheel, a bicycle wheel, a motorcycle wheel, a train wheel, or an airplane wheel etc.

The rim 10 is exposed out of a circumference surface of the wheel 100 to contact with the ground (not shown). The rim 10 is made of thermally and electrically conductive material, such as metal including steel, copper etc. The temperature of the rim 10 increases when the rim 10 slides on the ground. In the present embodiment, the wheel 100 further includes two tires 50, and the rim 10 is interposed between the two tires 50. In an alternative embodiment, the wheel 100 may only include one tire 50, and the rim 10 is attached to a side of the tire 50.

The hub 20 is secured to a wheel axle (not shown) of the wheel 100, therefore, the wheel 100 can be rotated by the wheel axle. The hub 20 is made of electrically conductive material, such as metal including steel, copper, etc.

In the present embodiment, the thermoelectric energy conversion module 30 includes three thermoelectric devices 31 and a battery 32. Each thermoelectric device 31 has one end thereof connected to the rim 10 and the other end thereof connected to the hub 20. The thermoelectric device 31 can create an electric voltage by thermoelectric effect when there is a temperature difference between the rim 10 and the hub 20. The thermoelectric device 31 can be made of semiconductor material.

The battery 32 is configured for collecting the electric energy generated by the thermoelectric device 31. The two electrodes of the battery 32 are connected to the hub 20 and the rim 10, respectively.

When a car using the wheel 100 brakes, or when an airplane using the wheel 100 lands, the temperature of the rim 10 of the wheel 100 will increase greatly in comparison with the temperature of the hub 20. Because of the temperature difference between the rim 10 and the hub 20, a potential difference or voltage will be created across the thermoelectric device 31 between the rim 10 and the hub 20 thereby charging the battery 32.

Figure 3:
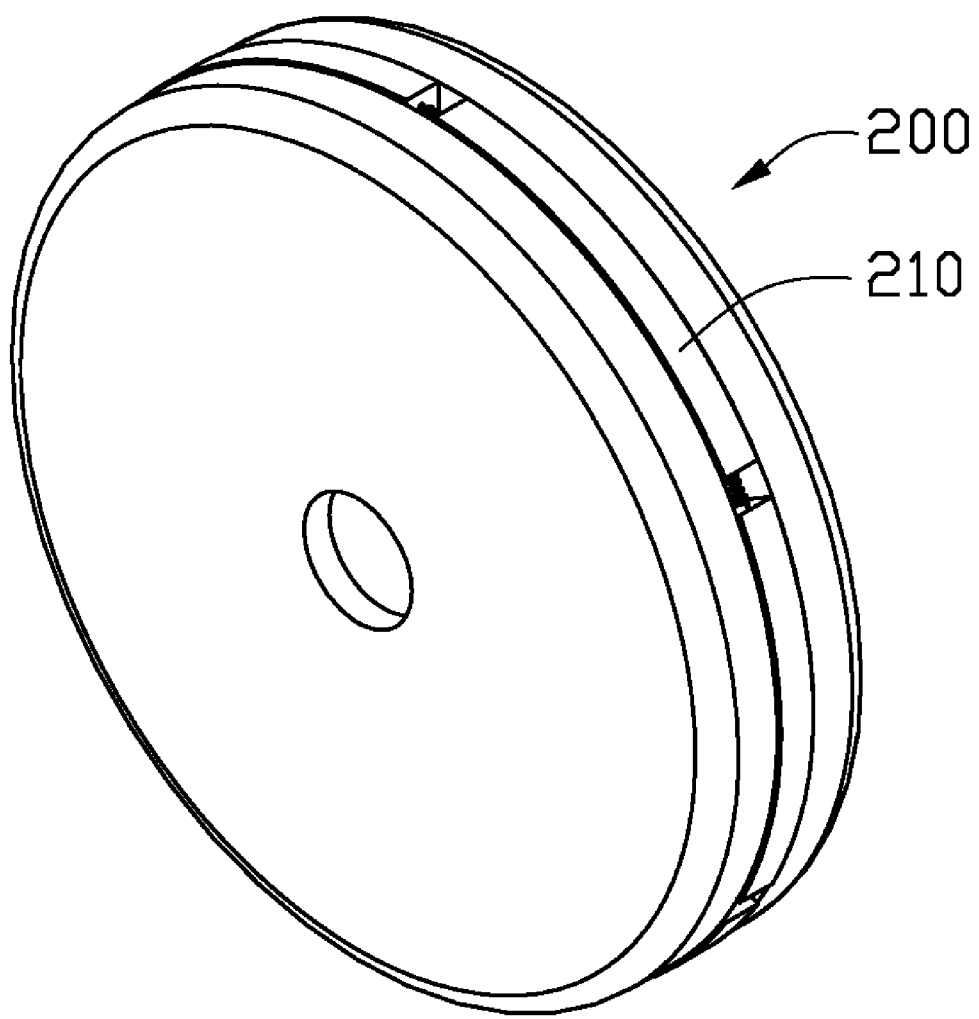
FIG. 3 is a schematic view of a wheel according to a second exemplary embodiment.
Figure 4:
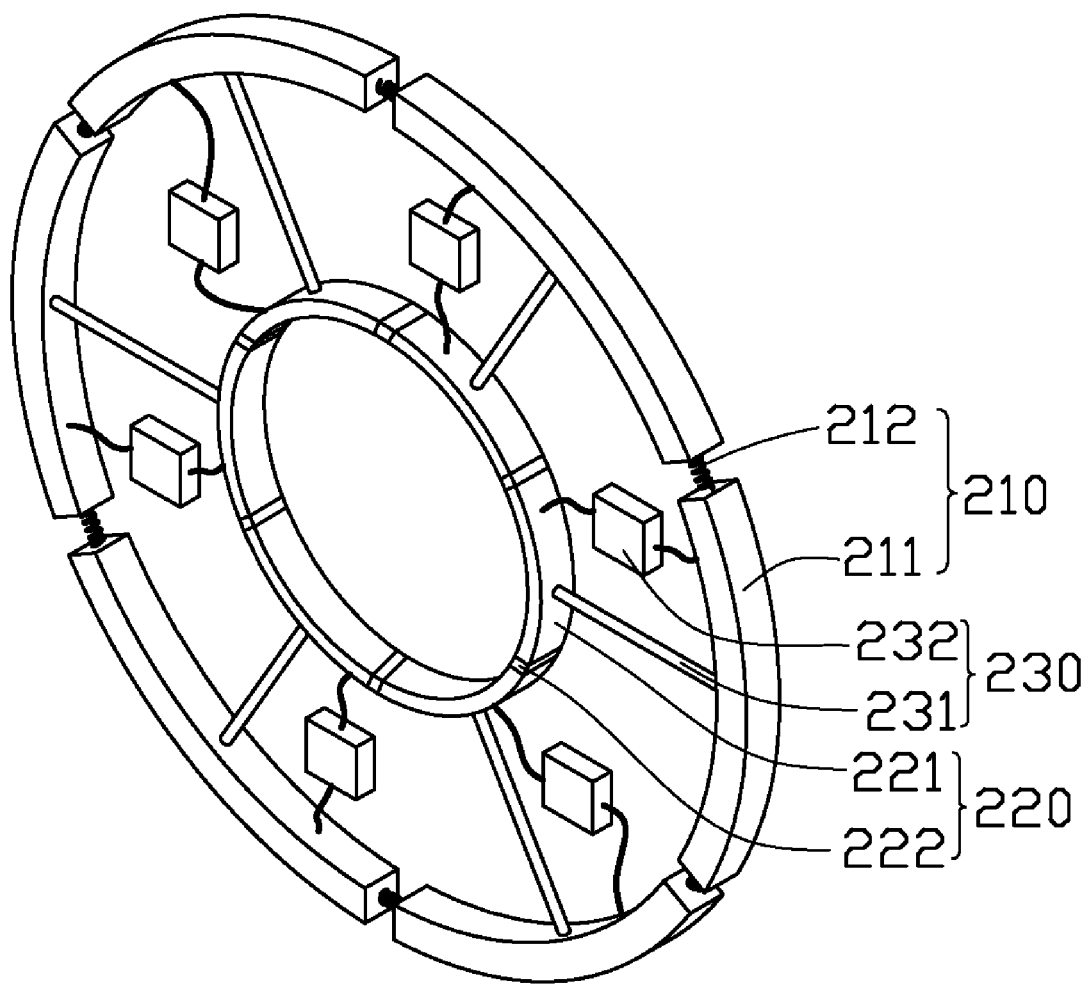
FIG. 4 illuminates the inner structure of the wheel of FIG. 3.

Referring to FIG. 3 and FIG. 4, a wheel 200, according to a second exemplary embodiment, is shown. The wheel 200 is similar to the wheel 100 of the first exemplary embodiment. The wheel 200 includes a rim 210, a hub 220, and six thermoelectric energy conversion modules 230.

The rim 210 includes six metal portions 211 and six first electrically insulating portions 212. The six metal portions 211 and six first electrically insulating portions 212 are connected alternately. In the present embodiment, the first electrically insulating portions 212 are made of elastic material. The hub 220 includes six electrically conductive portions 221 corresponding to the six metal portions 211, and six second electrically insulating portions 222 for separating adjacent electrically conductive portions 221.

Each thermoelectric energy conversion module 230 includes a thermoelectric device 231 and a battery 232. Each thermoelectric device 231 is connected between an electrically conductive portion 221 of the hub 220 and a metal portion 211 of the rim 210. The two electrodes of each battery 232 are connected to the electrically conductive portion 221 of the hub 220 and the metal portion 211 of the rim 210 to collect electric energy generated by the thermoelectric device 231.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A wheel comprising:
   a rim exposed out of a circumference surface of the wheel, and capable of contacting with the ground, the rim comprising at least one thermally and electrically conductive portion;
   a hub comprising at least one electrically conductive portion corresponding to the at least one thermally and electrically conductive portion of the rim; and
   a thermoelectric device connected between the at least one thermally and electrically conductive portion of the rim and the at least one electrically conductive portion of the hub, and configured for generating electric energy using temperature difference between the at least one thermally and electrically conductive portion of the rim and the at least one electrically conductive portion of the hub.

2. The wheel as claimed in claim 1, wherein the rim and the hub are both made of metal.

3. A wheel comprising:
- a rim exposed out of a circumference surface of the wheel, and capable of contacting with the ground, the rim comprising at least one thermally and electrically conductive portion;
- a hub comprising at least one electrically conductive portion corresponding to the at least one thermally and electrically conductive portion of the rim; and
- at least one thermoelectric energy conversion module, each thermoelectric energy conversion module comprising:
- a thermoelectric device connected between a thermally and electrically conductive portion of the rim, and an electrically conductive portion of the hub, the thermoelectric device configured for generating electric energy using temperature difference between the thermally and electrically conductive portion of the rim and the electrically conductive portion of the hub; and
- a battery with two electrodes thereof connected to the thermally and electrically conductive portion of the rim and the electrically conductive portion of the hub for collecting electric energy generated by the thermoelectric device.

4. The wheel as claimed in claim 3, wherein the wheel is a car wheel, a bicycle wheel, a motorcycle wheel, a train wheel, or an airplane wheel.

5. The wheel as claimed in claim 3, wherein the rim is made of metal.

6. The wheel as claimed in claim 3, wherein the hub is made of metal.

7. The wheel as claimed in claim 3, wherein the rim comprises a plurality of thermally and electrically conductive portions, each two adjacent thermally and electrically conductive portions are separated by an electrically insulating portion.

8. The wheel as claimed in claim 7, wherein the electrically insulating portion is made of elastic material.

9. The wheel as claimed in claim 3, wherein the hub comprises a plurality of electrically conductive portions, each two adjacent electrically conductive portions are separated by an electrically insulating portion.

10. A wheel comprising:
- a metal rim exposed out of a circumference surface of the wheel, and capable of contacting with the ground;
- an electrically conductive hub; and
- a thermoelectric device connected between the metal rim and the electrically conductive hub for generating electric energy using temperature difference between the metal rim and the electrically conductive hub; and
- a battery with two electrodes thereof connected to the metal rim and the electrically conductive hub for collecting electric energy generated by the thermoelectric device.

11. The wheel as claimed in claim 10, wherein the wheel is a car wheel, a bicycle wheel, a motorcycle wheel, a train wheel, or an airplane wheel.

12. The wheel as claimed in claim 10, wherein the hub is made of metal.

* * * * *